OSMOND F. PALMER
INVENTOR.

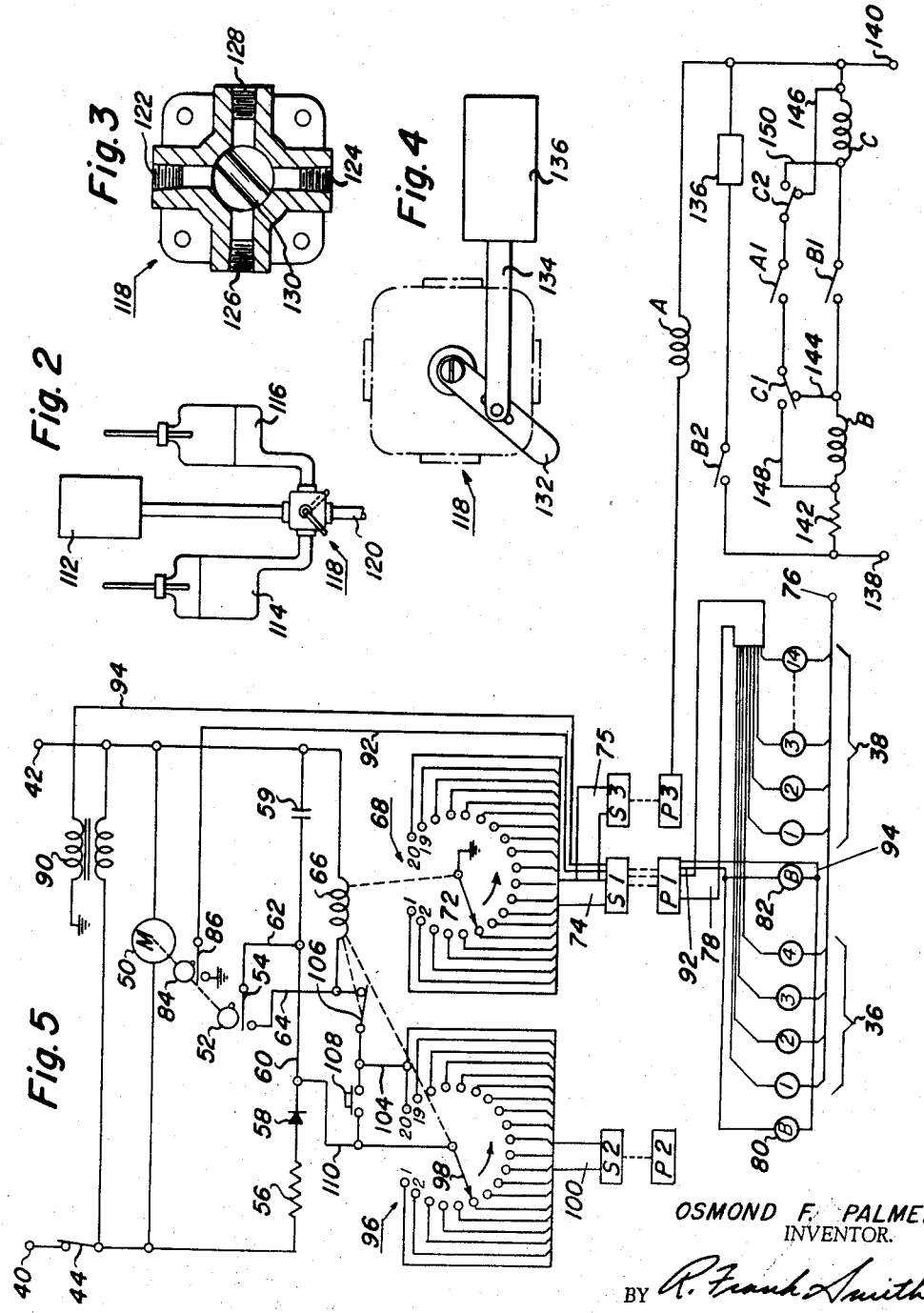

March 19, 1963
O. F. PALMER
3,081,688
PROCESS PROGRAMMING TIMER
Original Filed Aug. 22, 1957
3 Sheets-Sheet 3
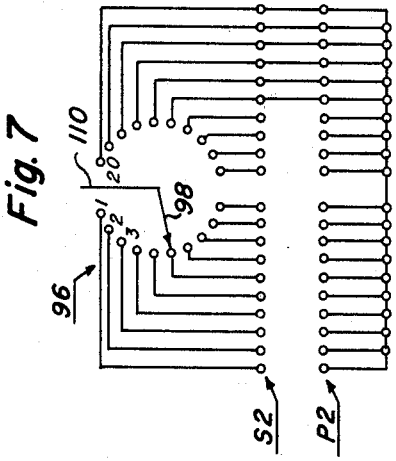
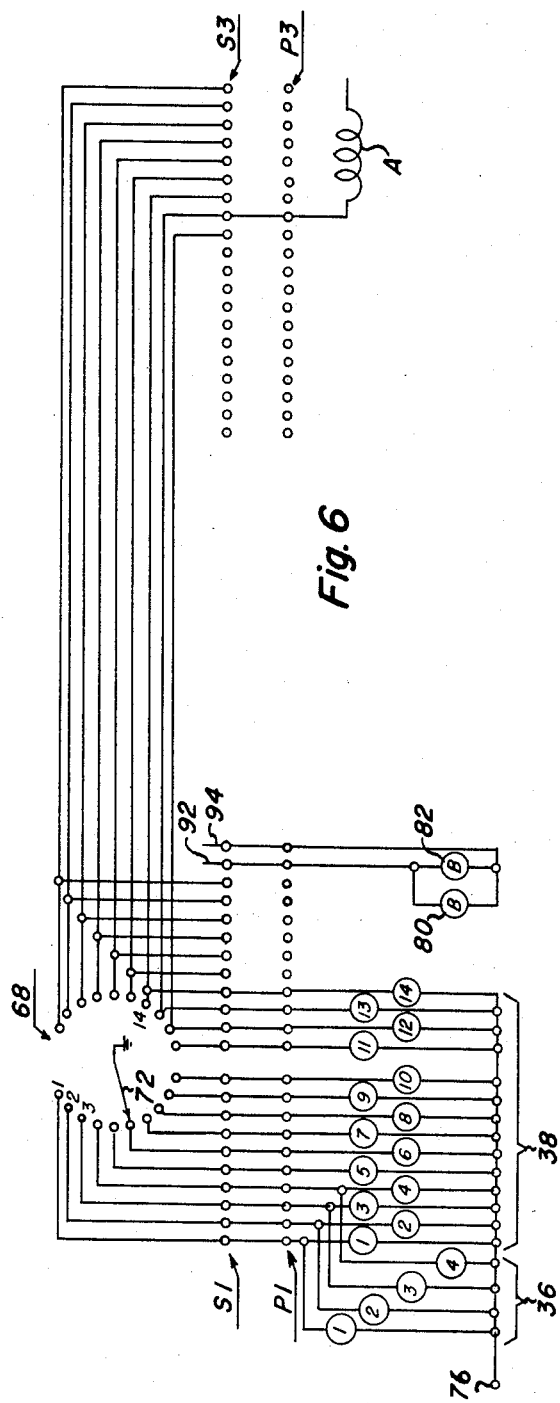
OSMOND F. PALMER
INVENTOR.
BY *R. Frank Smith*
*Robert W. Hampton*
ATTORNEYS

United States Patent Office 3,081,688
Patented Mar. 19, 1963

3,081,688
PROCESS PROGRAMMING TIMER
Osmond F. Palmer, Rochester, N.Y., assignor to Eastman Kodak Company, Rochester, N.Y., a corporation of New Jersey
Original application Aug. 22, 1957, Ser. No. 679,554, now Patent No. 2,987,711, dated June 6, 1961. Divided and this application Sept. 19, 1960, Ser. No. 56,737
3 Claims. (Cl. 95—89)

The present invention concerns semiautomatic photofinishing apparatus, and more particularly concerns a programming and timing circuit for such apparatus.

This application is a division of application Serial No. 679,554 filed August 22, 1957, now Patent No. 2,987,711.

Complex photofinishing processes, such as for the development of certain types of color negatives or prints, frequently involve large numbers of processing steps during which the negatives or prints are immersed in various solutions for periods of time that must be controlled with accuracy. In small commercial processing installations of this kind, where the cost of fully automatic processing equipment is not justified, the transfer of negatives or prints from one processing station to the next is done manually. If the processing of several batches of negatives or prints in the same apparatus is overlapped, such that the several batches are in different stages of processing at a given instant, the demands on an operator's attention are severe. In the past, these demands have been compounded by also requiring the operator to attend the replenishment of the various processing solutions as they become depleted.

It is therefore a principal object of the present invention to display signals that are visible to the operator of photofinishing equipment, identifying each successive processing step that is to be performed by the operator and the proper time at which it is to be performed.

It is a further object of the invention to warn the operator, by means of an audible signal, that a next visual signal will appear at the expiration of a predetermined time interval.

Further objects of the invention are:
To automatically replenish solutions at appropriate times in processing apparatus;
To selectively program indicating and replenishing means for applying the same to any of a plurality of different photofinishing processes.

Other objects of the invention will be apparent from the following description, reference being made to the accompanying drawings, wherein;

FIG. 2 is a side view of a replenishment unit;

FIG. 3 is an enlarged sectional side view of a valve in the replenishment unit;

FIG. 4 is an enlarged side view of the four-port replenishment valve showing a solenoid control thereof; and FIGS. 5, 6 and 7 are schematic wiring diagrams of the programming and timing circuit of the present invention.

*In General*

Figure 1:
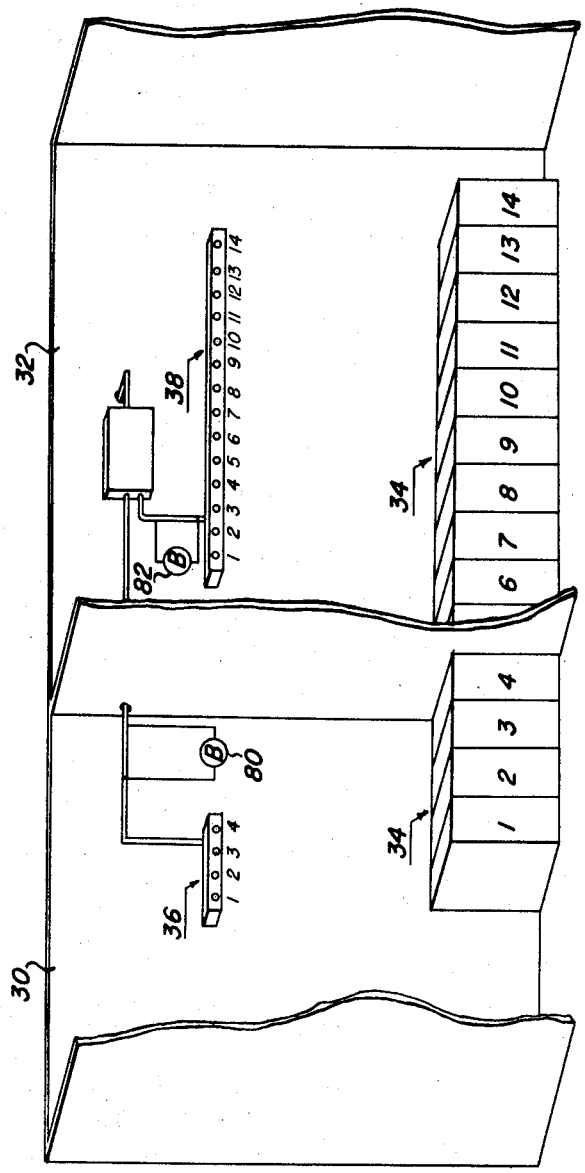
FIG. 1 is a general view of a typical processing installation employing the present invention.

The invention is illustrated in the environment of a photofinishing process having fourteen stations, four of which are in a darkened room, the other ten stations being in an illuminated room. Referring to FIG. 1 the darkened room is shown at 30 and the illuminated room at 32, with the processing stations being shown generally at 34. A first series of indicating lamps shown at 36 are arranged on a wall of room 30 and correspond in number to the processing stations in that room. A second series of indicating lamps, shown at 38, are arranged on a wall of room 32 and correspond in number, preferably, to the total number of processing stations, i.e., fourteen in the illustrated example. Lamps 36 and 38 are normally de-energized, but are energized in a predetermined sequence by means of a circuit described below to indicate to the operator that corresponding processing steps should then be performed.

*Lamp and Buzzer Programming Circuit*

The circuit for sequentially energizing lamps 36 and 38 is shown in FIGS. 5 and 6 and includes a source of A.C. power comprising a pair of terminals 40 and 42. A start switch 44, when closed, supplies power from terminal 40 to a motor 50 having a shaft which is geared in conventional manner to turn slowly, for example at one rotation per minute. A cam 52 on the motor shaft closes a switch 54 temporarily during each rotation of the shaft and completes a circuit from terminal 40 through switch 44, a resistor 56, a rectifier 58, a lead 60, a lead 62, switch 54, a lead 64, a coil 66 and terminal 42. It will be seen that the circuit through coil 66 is provided with direct current due to the presence of rectifier 58, which is connected through a filtering capacitor 59 directly to terminal 42. By means of the circuit described above, coil 66 is energized once during each rotation of the motor shaft. Coil 66 operates a pair of conventional stepping switches 68 and 69 each time it is energized, and advances wiper arms 72 and 98 of the respective stepping switches. Each stepping switch is illustrated as having twenty contacts, although that number may be varied in accordance with the requirements of a particular embodiment of the invention.

The contacts of stepping switch 68 are connected individually through a cable 74 to corresponding terminals of a socket S1 (FIGS. 5 and 6), and the terminals of socket S1 are selectively connectable to the terminals of a plug P1. In turn, the terminals of plug P1 are connected through a cable 78 and through the respective lamps 36 and 38 to a power source 76 (FIG. 6). Lamps 36 are connected in parallel with the corresponding lamps 38. Wiper arm 72 of switch 68 is grounded; therefore, each time it advances it closes the circuit from source 76 through the selected lamp or lamps to ground. The plug and socket connections shown in FIG. 6 are merely illustrative, it being understood that lamps 36 and 38 may be energized in any desired sequence by appropriately reconnecting the contacts P1 to those of socket S1.

A pair of buzzers 80 and 82, one located in each of the two processing rooms 30 and 32 (FIG. 1), are energized simultaneously a few seconds prior to each energization of the stepping switches, and thereby warn the operator that a next processing step must be performed soon. The apparatus for energizing buzzers 80 and 82 includes a second cam 84 (FIG. 5) mounted on the shaft of motor 50. Cam 84 closes a switch 86 temporarily during each rotation of the motor shaft and a few seconds prior to the closure of switch 54 by the cam 52. The closure of switch 86 completes a circuit from ground through a lead 92, socket S1 (FIG. 6), plug P1, buzzers 80 and 82 which are connected in parallel with each other, plug P1, socket S1, a lead 94 and the secondary winding of a transformer 90 (FIG. 5). The primary winding of transformer 90 is connected across power terminals 40 and 42 through switch 44.

*Resetting Circuits*

The present invention includes means for rapidly energizing coil 66 to thereby rapidly advance the wiper arms of the stepping switches to their initial positions. The resetting may be done automatically after arm 72 of stepping switch 68 has traversed all of its contacts that are connected to lamps 36 and 38. Alternatively, the resetting may be done manually, regardless of the position of the stepping switch arms.

In the illustrated embodiment of the invention, each of the stepping switches 68 and 96 is provided with twenty contacts, whereas only fourteen contacts on switch 68 are employed for energizing lamps 36 and 38. It would therefore be undesirable to wait for a full rotation of the shaft of motor 50 to advance wiper arm 72 past each of the unused contacts of switch 68. Accordingly, stepping switch 96 is employed during automatic resetting for rapidly energizing the stepping switch coil 66 when the wiper arms 72 and 98 reach their respective fifteenth contacts. This rapidly advances the wiper arms to their initial positions where they engage the respective first contacts of the stepping switches. In the general case, where $m$ contacts are provided on each stepping switch and $n$ of these contacts are used on switch 68 for energizing the lamps, then the final $m-n$ contacts are swept rapidly for automatic resetting.

The circuit for automatically resetting the stepping switches includes a normally closed interrupter switch 106 connecting the junction of coil 66 and lead 64 to the final contact, i.e., the twentieth contact, of switch 96 through a lead 104. Switch 106 is opened by conventional means whenever coil 66 is energized. The contacts of switch 96 are connected through a cable 100 to the respective contacts of a socket S2 which cooperates with a plug P2 as best shown in FIG. 7. The final six contacts of switch 96, or in the general case, the final $m-n$ contacts, are connected together by means of the selective wiring of the contacts of socket S2 to those of plug P2 and are therefore electrically identical. When wiper arm 98 of stepping switch 96 reaches the fifteenth contact of that switch, a circuit is completed from terminal 40 (FIG. 5) through switch 44, resistor 56, rectifier 58, a lead 110, wiper arm 98, the fifteenth contact of switch 96, socket S2 (FIG. 7), plug P2, socket S2, the twentieth contact of switch 96, lead 104 (FIG. 5), switch 106, coil 66 and terminal 42. When the interrupter switch 106 is opened by the energization of coil 66, it de-energizes that coil to reclose switch 106 and, in turn, re-energize coil 66, thereby completing the above circuit repetitively to step the wiper arms 72 and 98 until they rest on their respective first contacts and break the circuit between lead 104 and socket S2.

For manual resetting, a push-button switch 108 is provided to connect the junction of the interrupter switch 106 and lead 64 directly to lead 110, bypassing stepping switch 96 altogether. Therefore, as switch 108 is closed, coil 66 is energized through the interrupter switch 106 regardless of the position of wiper arm 98. Switch 108 may be released manually and thereby opened any time after wiper arm 98 has reached the fifteenth contact of switch 96, at which time the automatic resetting circuit described above becomes effective and steps the wiper arms 72 and 98 to their initial positions, regardless of the condition of the manual switch 108.

*Replenishment Control*

The present invention provides for the automatic replenishment of solutions used at the various processing stations. The replenishing apparatus for a typical station is shown in FIGS. 2–4.

Referring to FIG. 2, a tank 112 constitutes a source of a solution from which a pair of intermediate containers 114 and 116 are refilled, as required, through a valve 118. The internal construction of valve 118 is shown in FIG. 3. This valve has four ports 122, 124, 126 and 128 which are connected respectively to tank 112 (FIG. 2), containers 114 and 116 and an outlet pipe 120 leading to a processing tank at the particular station. A porting member 130 (FIG. 3) has two positions. In the position shown in FIG. 3 member 130 connects the inlet port 122 to port 126 for container 114 and therefore refills that container. In this position, member 130 also connects port 128 for container 116 to the outlet port 124 and therefore supplies solution to the associated processing tank from the latter container. When the position of member 130 is reversed, it connects port 122 to port 128, refilling container 116, and connects port 126 to the outlet port 122, supplying solution to the processing equipment from container 114.

The porting member 130 of valve 118 is rigidly secured to a control handle 132 (FIG. 4) which has a pin and slot connection with the plunger 134 of a solenoid 136. When solenoid 136 is energized, it moves handle 132 to the right (as viewed in FIG. 4), thereby reversing the position of the porting member 130 (FIG. 3). De-energization of solenoid 136 causes handle 132 and member 130 to be returned to their illustrated positions by conventional spring means not shown.

The circuit shown in FIGS. 5 and 6 includes means for energizing and de-energizing solenoid 136 during successive cycles of wiper arm 72 of stepping switch 68. The series of contacts of stepping switch 68 are connected to a socket S3 through a cable 75 in parallel with cable 74. Socket S3 cooperates with a plug P3 as shown best in FIG. 6, such that any contact of plug P3 is selectively connectable to any contact of socket S3. A respective circuit constituting a portion of each automatic replenishment unit has an input relay coil A connected to a selected contact of plug P3 and power terminal 140 having the same potential as source 76. For clarity of illustration only one coil A is shown in FIGS. 5 and 6. It will be seen that the various coils A can be operated in any desired sequence by the selective wiring of plug P3 and socket S3.

In each replenishment circuit a relay coil B (FIG. 5) and a relay coil C are connected in series with each other and in series with a first power terminal 138, a current-limiting resistor 142, a pair of normally open contacts B1 which are closed by energization of relay coil B, and a second power terminal 140. Since contacts B1 are normally open, coils B and C are normally de-energized. The junction of coil B and contacts B1 is normally connected through a lead 144 and a pair of double-throw contacts C1 to one side of a pair of contacts A1, the other side of contacts A1 normally being connected through a pair of double-throw contacts C2 and a lead 146 to terminal 140, bypassing coil C. Contacts A1 are normally open and are closed in response to energization of coil A. Contacts C1 and C2 are reversed by the energization of coil C. When contacts C1 are reversed they connect the junction of resistor 142 and coil B to contacts A1 through a lead 148, bypassing coil B. When contacts C2 are reversed they connect contacts A1 to the junction of contacts B1 and coil C, thereby placing coil C in the power circuit.

The control solenoid 136 for valve 118 (FIG. 4) is connected in series with terminals 138 and 140 (FIG. 5) and with a normally open pair of contacts B2 which are closed in response to the energization of coil B. Successive energization of coil A causes solenoid 136 to be alternately energized and de-energized in the following manner.

Assuming that the replenishment circuit stands as shown in FIG. 5 with coils A, B and C and solenoid 136 de-energized, a first pulse applied to coil A energizes that coil to close contacts A1 and complete the circuit from terminal 138 through resistor 142, coil B, lead 144, contacts C1, A1 and C2 and lead 146 to terminal 140, thereby energizing coil B and closing contacts B1 and B2. Closure of contacts B2 energizes solenoid 136. Closure of contacts B1 completes a circuit from terminal 138 through resistor 142, coil B, contacts B1, and coil C to terminal 140. However, since coil C is still bypassed through lead 146, it is not energized at this time. When coil A is de-energized by the subsidence of the pulse applied thereto, contacts A1 open to break the circuit bypassing coil C and the latter coil is energized through resistor 142, coil B and contacts B1. Energization of coil C reverses contacts C1 and C2. Reversal of contacts C1 bypasses coil B through lead 148; however, contacts A1 remain open to maintain the bypass circuit open and coil B remains energized through resistor 142, contacts B1 and coil C, which constitute a holding circuit for coil B. Therefore, contacts B2 remain closed and solenoid 136 remains energized. The reversal of contacts C2 connects the open contacts A1 to lead 140 for partially completing a second circuit through coil C.

When a second pulse is applied to coil A, as occurs during the next cycle of stepping switch 68, contacts A1 are closed to establish a circuit around coil B and through coil C, this circuit extending through resistor 142, lead 148, contacts C1, A1 and C2 and lead 150. Coil B is therefore de-energized to open contacts B1 and B2, thereby de-energizing solenoid 136 and opening one of the two circuits through coil C. When the second pulse applied to coil A subsides, contacts A1 are reopened and interrupt the second circuit through coil C, thereby de-energizing the latter coil to again reverse contacts C1 and C2. The second reversal of contacts C1 and C2 restores the entire circuit to the initial condition shown in FIG. 5.

It will be seen from the foregoing description that the replenishing circuit operates in binary fashion and that numerous other binary circuits could be employed in its stead without departing from the scope of the invention.

I claim:

1. In a device of the class described, the combination comprising: a stepping switch having a wiper arm and a series of $m$ contacts; a coil operable in response to successive energizations thereof to advance said wiper arm into cooperative engagement with said contacts; means for repetitively energizing said coil; a series of $p$ processing stations, each processing station including (a) a switching circuit having two stable operating states and adapted to have its state reversed in response to each application of electric power thereto, (b) a control device having two operating positions, (c) a connection between the switching circuit and the control device for reversing the position of the latter in response to each reversal of operating state of the former, (d) a tank of solution, (e) a pair of intermediate containers, (f) an outlet, (g) a valve adapted to selectively interconnect the tank to either one of said intermediate containers and the remaining container to said outlet, and (h) a connection between said control device and said valve for reversing said valve interconnections in response to each reversal of said control device; with manually settable means for selectively interconnecting the various contacts of said stepping switch with the respective switching circuits of the various processing stations; and means connected to said stepping switch wiper arm for applying electric power through said arm to the successive contacts engaged thereby.

2. The device defined in claim 1, wherein said switching circuit includes: an input relay for receiving electric power from the associated contact of said stepping switch; second and third relays connected in series with each other; electric power terminals and a first normally open switch connected in series with said second and third relays said first switch being closed during energization of said second relay; means including a second normally open switch closed during energization of said input relay; a pair of double-throw switches each having two closed positions reversible during energization of said third relay; leads interconnecting the second and third relays, the second normally open switch and the double-throw switches to establish a circuit from said power terminals through the second relay and bypassing the third relay when the double-throw switches are in one position and to establish a circuit from the power terminals through the third relay and bypassing the second relay when the double-throw switches are in the other position; and a third normally open switch and a solenoid in series with each other and with said power terminals, said third normally open switch being closed during energization of said second relay, with a mechanical linkage between said solenoid and said control device.

3. The device defined in claim 1, wherein $m>p$, and wherein said means for repetitively energizing said coil includes a power source, a normally open switch effective, when closed, to connect said coil in series with said power source, and a timing cam for automatically and periodically closing said normally open switch; with: a second stepping switch having a wiper arm and a series of $m$ contacts, the series of contacts in each of the first and second stepping switches having an initial contact and a final contact, said coil being operable in response to successive energizations thereof to advance the wiper arm of the second stepping switch into cooperative engagement with the various contacts of said second stepping switch; a normally closed interrupter switch opened in response to each energization of said coil and connecting said coil to the final contact of said second stepping switch; a connection from the wiper arm of the second stepping switch to said power source in parallel with said normally open switch; and a plug and socket device for selectively interconnecting the final contact of the second stepping switch to the various other contacts thereof.

References Cited in the file of this patent

UNITED STATES PATENTS

| | | |
|---|---|---|
| 1,450,023 | Edelman | Mar. 27, 1923 |
| 1,623,788 | Hoxie | Apr. 5, 1927 |
| 1,965,504 | Marcon | July 3, 1934 |
| 2,764,074 | Rosenberg | Sept. 25, 1956 |